(12) United States Patent
Loh et al.

(10) Patent No.: US 10,701,007 B2
(45) Date of Patent: Jun. 30, 2020

(54) EFFICIENT ATTACHMENT OF FILES FROM MOBILE DEVICES

(71) Applicant: Microsoft Technology Licensing, LLC, Redmond, WA (US)

(72) Inventors: Philip Z. Loh, Seattle, WA (US); Yamin Wang, Bellevue, WA (US); Elena Catrinescu, Woodinville, WA (US); Jun Chen, Redmond, WA (US); Jin Ma, Redmond, WA (US); Yue Ma, Issaquah, WA (US); Jia Guo, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 135 days.

(21) Appl. No.: 16/059,992

(22) Filed: Aug. 9, 2018

(65) Prior Publication Data
US 2020/0053031 A1 Feb. 13, 2020

(51) Int. Cl.
*H04L 12/58* (2006.01)
*G06F 16/955* (2019.01)
(Continued)

(52) U.S. Cl.
CPC ............ *H04L 51/08* (2013.01); *G06F 16/381* (2019.01); *G06F 16/9554* (2019.01);
(Continued)

(58) Field of Classification Search
CPC .......... G06K 19/06018–06037; G06F 16/381; G06F 16/954–9554; G06Q 10/10;
(Continued)

(56) References Cited

U.S. PATENT DOCUMENTS 9,158,770 B1 10/2015 Beadles
9,348,929 B2 5/2016 Eberlein
(Continued)

FOREIGN PATENT DOCUMENTS

WO 20142106120 A1 12/2014

OTHER PUBLICATIONS

"International Search Report and Written Opinion Issued in PCT Application No. PCT/US2019/038826", dated Sep. 2, 2019, 11 Pages.
(Continued)

*Primary Examiner* — Brendan Y Higa
(74) *Attorney, Agent, or Firm* — Liang IP, PLLC

(57) ABSTRACT

Computing systems configured to efficiently attach files to emails are disclosed herein. In one embodiment, a mobile device can include a processor, a camera, and a memory operatively coupled to the processor. The memory contains instructions executable by the processor to cause the computing device to capture, via the camera, an image of a machine-readable label shown on a display of a client device used to compose a draft email and decode the captured image of the machine-readable label to derive a network address of a webpage, an authentication token, and an email identification identifying the draft email. The mobile device can also load the webpage in a web browser, and upon receiving an input to upload a file, transmit the digital file to an upload server along with the decoded authentication token and the email identification for attaching the file to the draft email.

20 Claims, 10 Drawing Sheets

(51) Int. Cl.
*G06K 19/06* (2006.01)
*H04L 29/06* (2006.01)
*H04M 1/725* (2006.01)
*G06F 16/38* (2019.01)
*G06Q 10/10* (2012.01)
*H04L 9/32* (2006.01)

(52) U.S. Cl.
CPC ..... *G06K 19/06037* (2013.01); *G06Q 10/107* (2013.01); *H04L 9/3213* (2013.01); *H04L 51/046* (2013.01); *H04L 63/08* (2013.01); *H04L 63/12* (2013.01); *H04L 63/126* (2013.01); *H04M 1/72547* (2013.01)

(58) Field of Classification Search
CPC .......... G06Q 10/107; H04L 9/32–3213; H04L 9/3226–3228; H04L 51/046–066; H04L 51/08–10; H04L 51/22; H04L 51/34; H04L 63/08–0846; H04L 63/12–126
See application file for complete search history.

(56) References Cited

U.S. PATENT DOCUMENTS

| | | | | |
|---|---|---|---|---|
| 2002/0019851 | A1* | 2/2002 | Pollack | H04L 51/14 |
| | | | | 709/206 |
| 2004/0186851 | A1* | 9/2004 | Jhingan | H04L 51/00 |
| 2004/0193638 | A1* | 9/2004 | Taniguchi | G06F 9/445 |
| 2005/0231513 | A1* | 10/2005 | LeBarton | G06T 13/00 |
| | | | | 345/473 |
| 2007/0016613 | A1* | 1/2007 | Foresti | G06Q 10/107 |
| 2009/0037520 | A1* | 2/2009 | Loffredo | H04L 63/105 |
| | | | | 709/203 |
| 2009/0039146 | A1 | 2/2009 | Seo | |
| 2010/0262635 | A1* | 10/2010 | Hambleton | G06Q 10/06 |
| | | | | 707/812 |
| 2013/0221083 | A1 | 8/2013 | Doss et al. | |
| 2014/0214984 | A1* | 7/2014 | Lee | H04L 51/063 |
| | | | | 709/206 |
| 2014/0372544 | A1* | 12/2014 | Wen | H04L 51/046 |
| | | | | 709/206 |
| 2015/0134751 | A1 | 5/2015 | Meyers et al. | |
| 2015/0350135 | A1 | 12/2015 | Kato | |
| 2016/0099896 | A1* | 4/2016 | Huang | H04L 63/083 |
| | | | | 709/206 |
| 2016/0147900 | A1 | 5/2016 | Bezek | |
| 2016/0217217 | A1 | 7/2016 | Boudville | |
| 2019/0036889 | A1* | 1/2019 | Scheinuk | H04L 9/3226 |

OTHER PUBLICATIONS

Lacoma, Tyler, "How to transfer tiles from Android to your PC—the easy way", Retrieved from: https://www.digitaltrends.com/computing/how-to-transfer-files-from-android-to-your-pc/, Nov. 1, 2017, 11 Pages.

Murray, Carrie, "WeChat Transfer Files Between Android/iPhone and Computer", Retrieved from: https://www.fonepaw.com/wechat/wechat-file-transfer-android-iphone-pc.html, Dec. 19, 2017, 9 Pages.

* cited by examiner

EFFICIENT ATTACHMENT OF FILES FROM MOBILE DEVICES

BACKGROUND

Electronic Mail ("email" or "e-mail") is a technique of exchanging messages between users using computers, smartphones, or other types of electronic devices. Email exchanges operate across computer networks such as the Internet or an intranet. Today's email systems are typically based on a store-and-forward model utilizing email servers to accept, forward, and store email messages. Users can connect to email servers or webmail interfaces via a computer network to send or receive email messages.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An email message typically includes a message header, a message body, and optionally one or more attachments appended to the email message. A message header can include structured data fields individually containing source/destination email addresses (e.g., "To:" or "From") and/or other suitable information describing the email message, such as importance. A message body can contain data, such as in plain text or Hypertext Markup Language ("HTML") text data, representing information conveyed in an email message. Attachments can include Microsoft Word® documents, images, videos, or other suitable types of data files. During composition of an email message, a user can utilize a standalone email client (e.g., Microsoft Outlook®) on a client device (e.g., a desktop) or a web-based email client such as Gmail provided by Google Inc. of Mountain View, Calif. Utilizing either the standalone or the web-based email client, the user can insert source/destination email addresses, type a message body in plain or HTML text, and attach one or more files such as images, documents, videos, etc.

In certain implementations, only files residing on or directly accessible via the client device can be readily attached to a draft email message that a user is currently composing. For example, the user can start an attachment utility in the email client to browse and select one or more files residing on a hard drive of the client device. In another example, the user can also select one or more files from a network drive, a cloud storage space, or other suitable storage locations accessible via the client device. Upon completion of email composition, the draft email message can be sent with a copy of the attached files to an email server, which in turn forwards the email message with the attachment to one or more suitable destinations.

The foregoing attachment technique can present certain difficulties when the one or more files to be attached are not readily accessible via the client device of a user. For example, the one or more files can reside on or to be taken by a mobile device such as a smartphone or a tablet of the same user or a different user instead of the client device. One way to attach a file from the mobile device includes locally connecting the mobile device to the client device via wired (e.g., using a cable) or wireless connection (e.g., via WIFI, Bluetooth, etc.). Once the local connection is established, the user can first copy the file from the mobile device to the hard drive of the client device and then attach the copied file to the draft email message. Such multi-stepped operations can be cumbersome and may require device/system dependent hardware/software utilities, such as special cables and connection utility applications, which may not be readily available.

Several embodiments of the disclosed technology can enable the user to efficiently attach one or more files from the mobile device to a draft email message the user is composing on the client device without first copying the files from the mobile device to the client device. In certain implementations, the user can indicate attachment of a file from the mobile device by actuating a menu item, an icon, or other suitable types of interface element in the standalone or web-based email client. In response, the email client can generate a barcode, a Quick Response Code (QR code), or other suitable types of machine-readable optical label or other suitable types of label. The generated optical label can encode various information or data such as, for example, a network address (e.g., a universal resource locator or URL) of an upload webpage provided by an upload server, an authentication token to an email server of the user, an email identification (e.g., an alphanumeric string) identifying the draft email message, or other suitable information. The email client can then output the optical label on a monitor, a touchscreen, or other suitable types of display of the client device.

The user can then use a camera, scanner, or other suitable types of hardware/software utility on the mobile device to scan or capture an image of the optical label on the display of the client device. Based on the captured image, the mobile device can decode the machine-readable data of the optical label to obtain the URL of the upload webpage, the authentication token, the email identification, and/or other suitable information. In certain embodiments, once the URL of the upload webpage is decoded, the mobile device can automatically launch a web browser on the mobile device to access the upload webpage at the decoded URL. In other embodiments, the web browser may be manually started by the user, launched upon user confirmation, or initialized in other suitable manners to access the upload webpage at the decoded URL.

Once arrived at the upload webpage, the user is provided with functionalities to select and upload one or more files from the mobile device to the upload server. The one or more files can already reside on the mobile device, or the user may be prompted to create new files by, for example, taking one or more pictures with the camera of the mobile device. Upon user selection of one or more files to upload, the mobile device can upload the selected files via a computer network to the upload server along with the decoded authentication token and the email identification.

Once the upload server receives the uploaded files, the decoded authentication token, and the email identification from the mobile device, the upload server can authenticate with the email server using the received authentication token for access to a copy of the draft email message on the email server. Upon success of authentication, the upload server can transmit the received one or more files along with the email identification to the email server to be attached to the draft email message. The email server in turn, can identify a copy of the draft email message being composed on the client device according to the email identification and attach the one more files to the identified copy of the draft email message. A copy of the one or more files can also be transmitted from the email server to the client device when, for example, the draft email message is synchronized between the email server and the client device before or after the email message is sent.

Thus, several embodiments of the disclosed technology can enable efficient attachment of files from the mobile device without a wired or wireless local connection between the mobile device and the client device. Instead, a URL of the upload webpage is provided to the mobile device using an optical or other suitable types of label. The upload webpage can then facilitate uploading of the one or more files from the mobile device to the upload server. Upon receiving the uploaded files, the upload server can interact with the email server to authenticate and attach a copy of the one or more files to a copy of the draft email message on the email server. Thus, from the user's perspective, the one or more files from the mobile device can appear to be attached directly from the mobile device to the draft email message without having to move the files from the mobile device to the client device. As such, cumbersome operations of copying the files between the mobile device and the client device can be eliminated.

DETAILED DESCRIPTION

Figure 1:
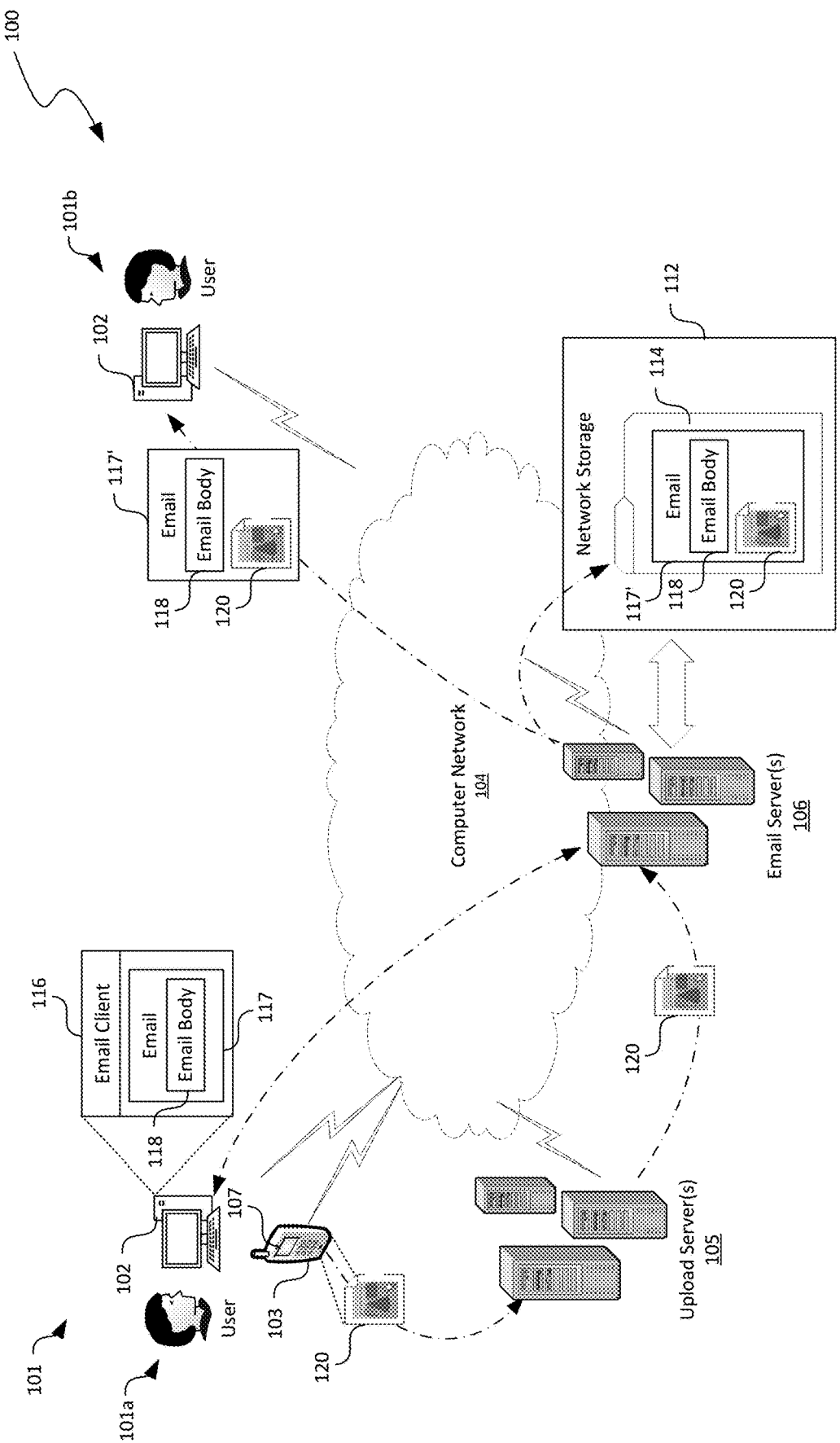
FIG. 1 is a schematic diagram illustrating a computing system implementing efficient attachment of files from mobile devices in accordance with embodiments of the disclosed technology.

Certain embodiments of systems, devices, components, modules, routines, data structures, and processes for efficient attachment of files in computing systems are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-5.

As used herein, the term "email server" generally refers to computer dedicated to running such applications that are configured to receive incoming emails from senders and forward outgoing emails to recipients via a computer network, such as the Internet. Examples of such applications include Microsoft Exchange®, qmail, Exim, and sendmail. An email server can maintain and/or access one or more inboxes for corresponding users. As used herein, an "inbox" is a file folder configured to contain data representing incoming emails for a user. The email server can also maintain and/or access one or more outboxes configured to contain outgoing emails and/or other suitable mailboxes. Also used herein, a "draft email" or "draft email message" is an email being composed on, for example, a client device, and not yet transmitted to an intended destination.

Also used herein, an "attachment" or "email attachment" generally refers to a file appended to an email. An attachment can be any suitable types of files. For example, an attachment can be an image file, a video file, a document file, etc. An "image file" as used herein generally refers to a digital file configured to organize and store digital images. Image files can be composed of digital data in one of these formats that can be rasterized for use on a computer display or printer. An image file format may store data in uncompressed, compressed, vector, or other suitable formats. Once rasterized, an image file becomes a grid of pixels, each of which has a number of bits to designate a color equal to a color depth. Example image file formats include Joint Photographic Experts Group, Exchangeable image file format, Tagged Image File Format, Graphics Interchange Format, bitmap file format, and Portable Network Graphics.

Also used herein, the term "machine-readable label" generally refers to an image containing visual patterns useable for encoding digital data. Examples of machine-readable label can include a barcode, a Quick Response code, or other suitable types of optical label for encoding information. A machine-readable label can utilize various encoding modes (e.g., numeric, alphanumeric, byte/binary, and kanji) to efficiently store data, which can then be captured using a camera or scanner and decoded with suitable software. For example, a QR code typically includes multiple black squares arranged in a square grid on a white background. A QR code can be read by a camera and processed using Reed-Solomon error correction until encoded information is appropriately interpreted. The encoded data can then be extracted from patterns that are present in both horizontal and vertical components of the QR code.

When composing emails on a desktop, laptop, or other suitable types of client device, a user sometimes may desire to attach a file (e.g., a photo) that resides on a mobile device, such as a smartphone, or to be taken by the user using the mobile device. However, in order to attach such a file from the mobile device, the user may need to locally connect the mobile device to the client device via wired (e.g., using a cable) or wireless connection (e.g., via WIFI, Bluetooth, etc.). Once the local connection is established, the user can first copy the file from the mobile device to the hard drive of the client device and then attach the copied file to the draft email. Such multi-stepped operations can be cumbersome and may require device/system dependent hardware/software utilities, such as special cables and connection utility applications, which may not be readily available.

Several embodiments of the disclosed technology can enable the user to efficiently attach one or more files from the mobile device directly to a draft email the user is composing on the client device without first copying the files from the mobile device to the client device. In certain implementations, upon receiving an indication to attach a file from the mobile device, an email client on the client device can generate a machine-readable label that encodes various information or data such as, for example, a network address (e.g., a universal resource locator or URL) of an upload webpage provided by an upload server, an authentication token to an email server of the user, an email identification (e.g., an alphanumeric string) identifying the draft email message, or other suitable information. The email client can then output the optical label on a monitor, a touchscreen, or other suitable types of display of the client device.

The user can then scan the machine-readable label using a camera of the mobile device to obtain the URL of the upload webpage, authentication token, and the email identification. The user can then upload the desired file from the mobile device to the upload server via the upload webpage. Upon receiving the uploaded files, the upload server can interact with the email server to authenticate and attach a copy of the one or more files to a copy of the draft email message on the email server. Thus, from the user's perspective, the one or more files from the mobile device can appear to be attached directly from the mobile device to the draft email message without having to move the files from the mobile device to the client device. As such, cumbersome operations of copying the files between the mobile device and the client device can be eliminated, as described in more detail below with reference to FIGS. 1-5. Even though attachment to emails is used as an example to illustrate various aspects of the disclosed technology below, in other implementations, the disclosed technology can also be used for attachment of pictures, videos, or other suitable types of files to a social media page (e.g., a Facebook page), an instant message (e.g., WhatsApp), or other suitable types of communications means.

FIG. 1 is a schematic diagram illustrating an example computing system 100 implementing efficient attachment of files in accordance with embodiments of the disclosed technology. As shown in FIG. 1, the computing system 100 can include a computer network 104 interconnecting client devices 102, a mobile device 103, one or more upload servers 105, and one or more email servers 106 (referred to as "upload server 105" and "email server 106" herein for simplicity). The email server 106 is also interconnected with a network storage 112 containing one or more inboxes 114 corresponding to the users 101.

The computer network 104 can include an intranet, a wide area network, the Internet, or other suitable types of network. Even though particular components of the computing system 100 are shown in FIG. 1, in other embodiments, the computing system 100 can also include additional and/or different components or arrangements. For example, in certain embodiments, the computing system 100 can also include additional network storage devices, network devices, and/or other suitable components (not shown). In other embodiments, the upload server 105 may be integrated into the email server 106.

The client devices 102 can each include a computing device that facilitates corresponding users 101 to access computing services provided by the email server 106 via the computer network 104. For example, in the illustrated embodiment, the client devices 102 individually include a desktop computer. In other embodiments, the client devices 102 can also include laptop computers, tablet computers, or other suitable computing devices. Even though two users 101 (illustrated as first and second users 101a and 101b, respectively) are shown in FIG. 1 for illustration purposes, in other embodiments, the computing system 100 can facilitate any suitable number of users 101 to access suitable types of computing services provided by the email server 106.

The client device 102 can include suitable hardware/ software to provide various computer applications and/or services. For example, as shown in FIG. 1, the client device 102 can execute suitable instructions to provide an email client 116 configured to compose a draft email 117 having an email body 118. In certain embodiments, the email client 116 can be a standalone email client application, such as Microsoft Outlook®. In other embodiments, the email client 116 can also be a web-based email client such as Gmail provided by Google Inc., of Mountain View, Calif. In any of the foregoing embodiments, the email client 116 can be configured to generate a machine-readable label 119 (shown in FIG. 2A) encoding a network address of an upload webpage 122 (shown in FIG. 2A), an authentication token, an email identification corresponding to the draft email 117. The email client 116 can then output the generated machine-readable label on a monitor, touchscreen, or other suitable types of display of the client device 102.

The users 101 can also have access to one or more mobile devices 103. For example, as shown in FIG. 1, the first user 101a can have access to a mobile device 103 having a camera 107. In the illustrated example, the mobile device 103 is illustrated as a smartphone. In other examples, the mobile device 103 can also include a tablet with rear/front facing cameras, a network-enabled camera, or other suitable types of image capturing device. As described in more detail herein, several embodiments of the disclosed technology can allow the first user 101a to attached one or more files (e.g., a photo 120) on the mobile device 103 to the draft email 117 on the client device 102 even without direct wired or wireless connections between the client device 102 and the mobile device 103. Instead, the first user 101a can capture an image of the machine-readable label 119 surfaced on the display of the client device 102, decode the captured image to obtain the encoded network address of the upload webpage, authentication code, and the email identification. The first user 101a can then utilize the upload webpage to upload one or more files from the mobile device 103 to the email server 106 via the upload server 105.

The upload server 105 can be configured to facilitate uploading of one or more files such as the photo 120 from the mobile device 103 to the email server 106 as attachment to the draft email 117. In certain implementations, the upload server 105 can host the upload webpage 122 (shown in FIG. 2A) configured to facilitate selection and upload of one or more files from the mobile device 103 to the upload server 105. In other implementations, the upload webpage 122 may be hosted by a web server (not shown) that is separate from the upload server 105. In any of the foregoing embodiments, once the upload server 105 receives the photo 120 along with the authentication token and the email identification, the upload server 105 can be configured to authenticate itself to the email server 106 using the authentication code. Upon successful authentication, the upload server 105 can be configured to provide, via the computer network 104, the photo 120 to the email server 106 as an attachment to the server copy of the draft email 117' identified by the email identification.

The email server 106 can be configured to facilitate email reception, storage, forwarding, and other related functionalities. For example, as shown in FIG. 1, the first user 101a can utilize the client device 102 to generate the draft email 117 destined to the second user 101b. The draft email 117 can include an email header (not shown), an email body 118, and one or more attachments from the mobile device 103. In the illustrated example, the attachments include the photo 120. In other examples, the attachments can include one or more documents, video files, executable files, or other suitable types of files. Upon receiving an indication that the draft email 117 is started on the email client 116, the email server 106 can create and store a server copy of the email 117' in an inbox 114 on the network storage 112 that corresponds to the first user 101a. The indication can include an automatic saving of a copy of the draft email 117, or a manual save initiated by the first user 101a. The email server 106 can also be configured to facilitate attachment of files from the mobile device 103 directly to the server copy of the draft email 117' before forwarding the draft email 117' with the email body 118 and the photo 120 to the second user 101b. Operations and functional components of the mobile device 103, the upload server 105, and the email server 106 are described in more detail below with reference to FIGS. 2A-2C.

Figure 2A:
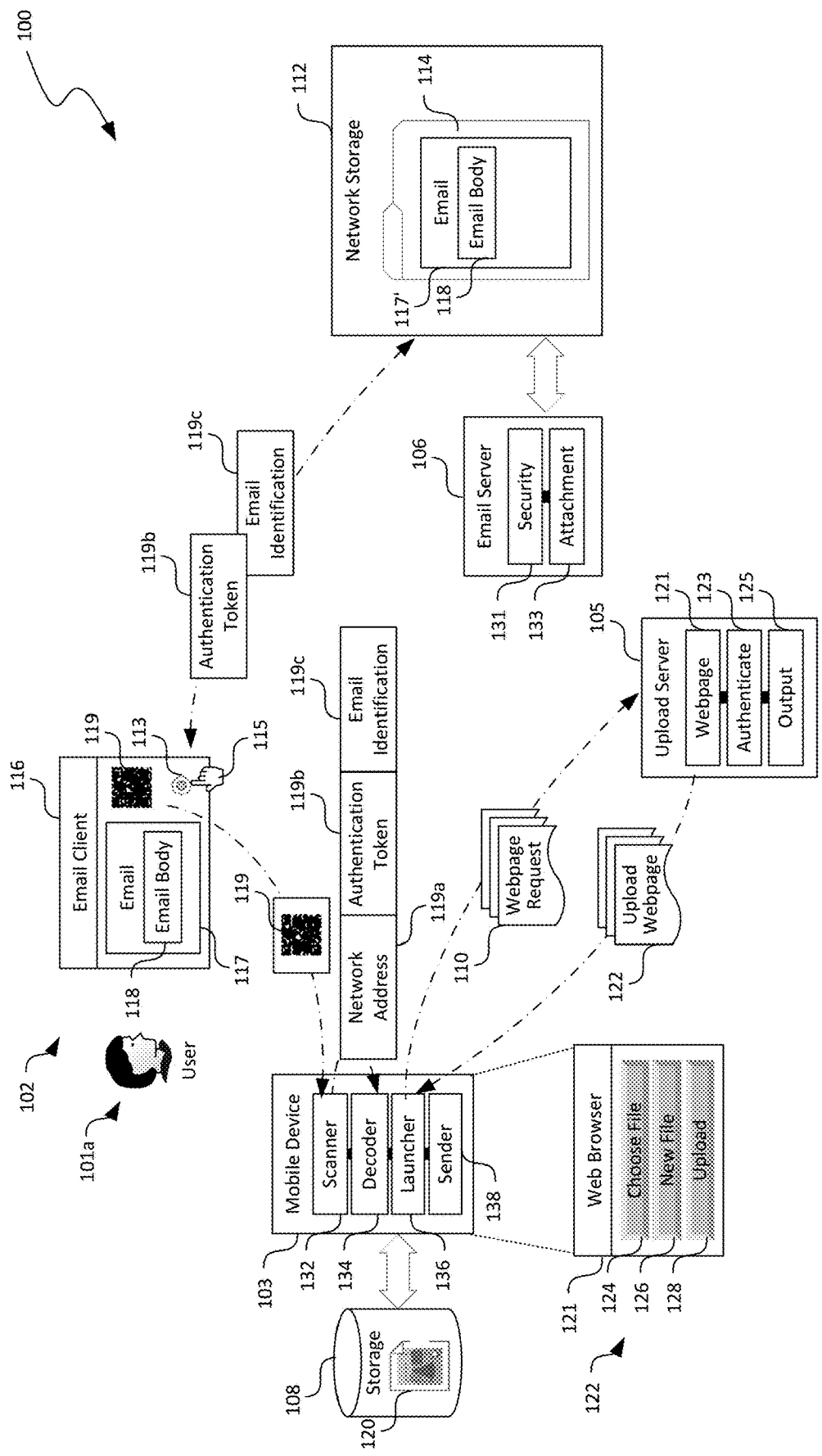
FIGS. 2A-2C are schematic diagrams illustrating certain hardware/software components of the computing system of FIG. 1 during various stages of operation in accordance with embodiments of the disclosed technology.
Figure 2B:
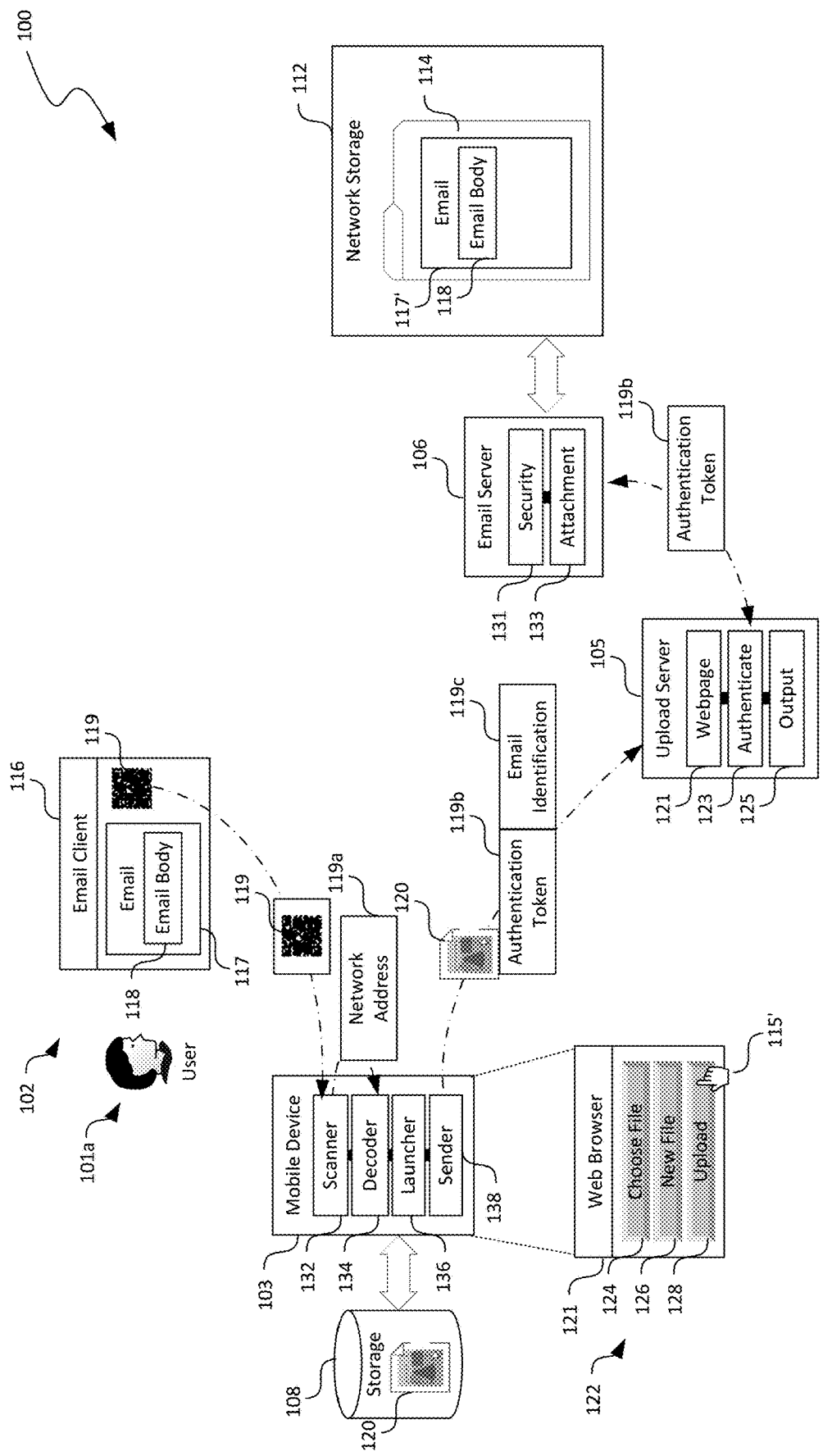
Figure 2C:
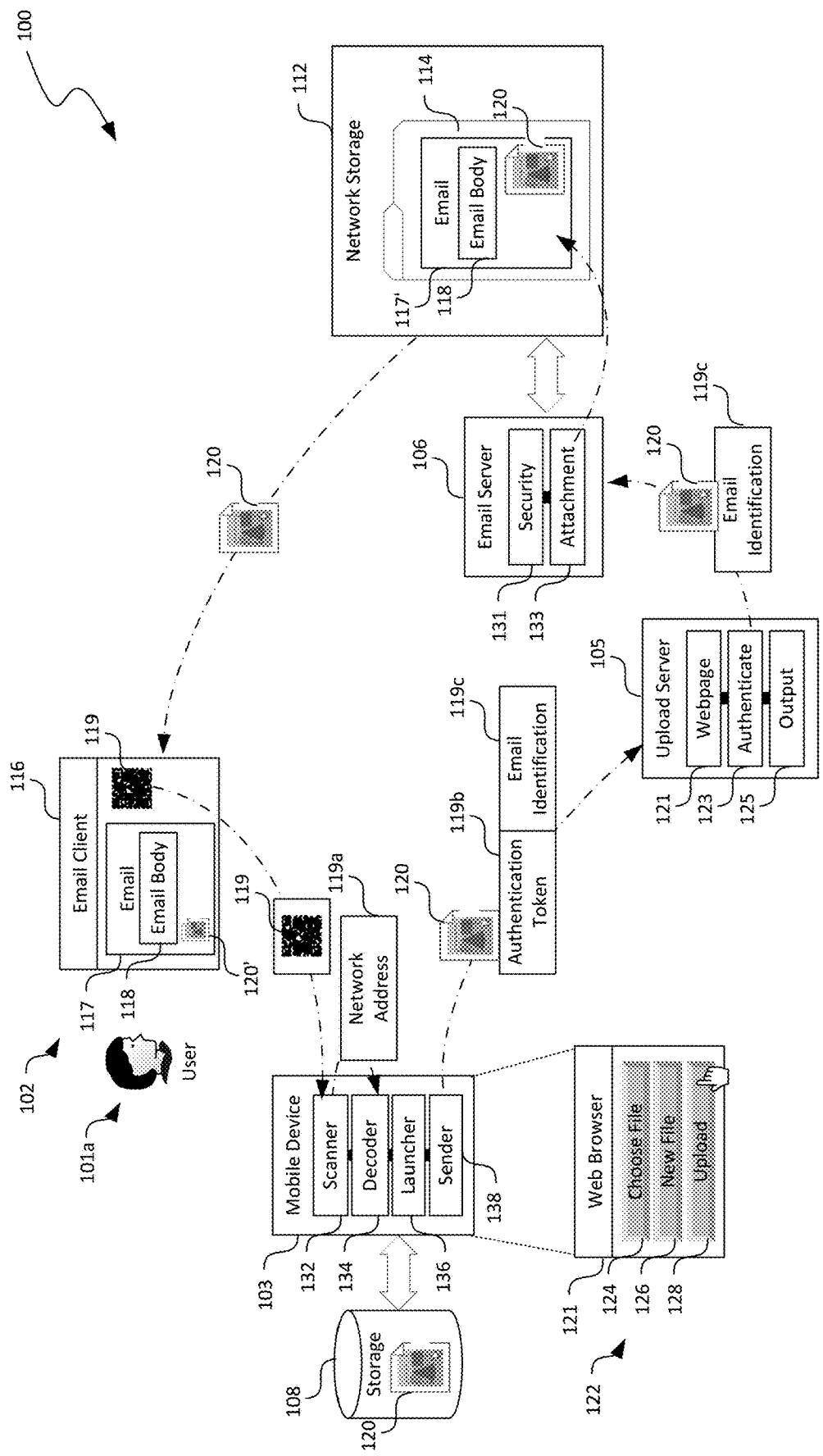

FIGS. 2A-2C are schematic diagrams illustrating certain hardware/software components of the computing system 100 during various stages of operations in accordance with embodiments of the disclosed technology. In FIGS. 2A-2C, only certain components of the computing system 100 of FIG. 1 are shown for clarity. In FIG. 2A and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices.

Equally, components may include hardware circuitry. A person of ordinary skill in the art would recognize that hardware may be considered fossilized software, and software may be considered liquefied hardware. As just one example, software instructions in a component may be burned to a Programmable Logic Array circuit, or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 2A, the email client 116 can include a menu item, a button, or other suitable types of interface element 113 (shown in FIG. 2A as a radial button for illustration purposes) for initializing a utility for attaching one or more files from the mobile device 103 to the draft email 117. When the first user 101a actuates the interface element 113, as indicated by the cursor 115, the email client 116 can be configured to generate and output on a display of the client device 102, a machine-readable label 119. In the illustrated example, the machine-readable label 119 is shown as a QR code. In other embodiments, the machine-readable label 119 can also include one-dimension barcode or other suitable types of optical label.

In accordance with embodiments of the disclosed technology, the email client 116 can be configured to generate the machine-readable label 119 that encodes various information. For example, as shown in FIG. 2A, the machine-readable label 119 can encode a network address 119a (e.g., a URL) of an upload webpage 122, an authentication token 119b, and an email identification 119c. In certain embodiments, the authentication token 119b and the email identification 119c can both include a random string generated by the email server 106, for example, when the server copy of the draft email 117' is created. In other embodiments, the authentication token 119b and/or the email identification 119c can include other suitable forms of digital data. In further embodiments, the authentication token 119a can be associated with a time-to-live value expiration of which would render the authentication token 119a invalid. The mobile device 103 can then be configured to capture the machine-readable label 119, decode the information from the captured machine-readable label 119 in order to initialize an upload process as described below.

In certain embodiments, the mobile device 103 can include a processor and a memory containing instructions executable by the processor to provide one or more software components. For example, as shown in FIG. 2A, the mobile device 103 can include a scanner 132, a decoder 134, a launcher 136, and a sender 138 operatively coupled to one another. The mobile device 103 can also have access to a storage 108 configured to store one or more digital files, such as photos 120. In the illustrated embodiment, the storage 108 can include a cloud storage, network storage, or other suitable types of remote storage that is separate from by accessible via the computer network 104 (FIG. 1) by the mobile device 103. In other embodiments, the storage 108 can be an internal storage (e.g., a solid state drive), a removable storage (e.g., a secured digital card), or other suitable storage medium in the mobile device 103. Even though the foregoing components are shown in FIG. 2A, in other embodiments, the mobile device 103 can also include image processing, network communications, or other suitable types of hardware/software components.

The scanner 132 can be configured to capture an image of the machine-readable label 119 by, for instance, taking a picture or scanning the machine-readable label 119 using the camera 107 (FIG. 1) of the mobile device 103. The scanner 132 can then be configured to process the captured image using Reed-Solomon or other suitable types of error correction until the image can be appropriately interpreted. The scanner 132 can then provide the captured image of the machine-readable label 119 to the decoder 134 for decoding information contained therein.

The decoder 134 can be configured to extract information encoded in the captured image of the machine-readable label 119. For example, as shown in FIG. 2A, the decoder 134 can be configured to extracted from patterns that are present in both horizontal and vertical components of the image of the example QR code to extract the network address 119a (e.g., a URL) of the upload webpage 122, the authentication token 119b, and an email identification 119c. In certain embodiments, the scanner 132 and the decoder 134 can be parts of the email client 116. In other embodiments, the scanner 132 and/or the decoder 134 can be separate components from the email client 116.

The launcher 136 can be configured to launch the upload webpage 122 in a web browser 121 on the mobile device 103. In one implementation, upon decoding the network address 119a by the decoder 134, the launcher 136 can be configured to automatically launch the web browser 121 and load the upload webpage 122 in the launched web browser 121 by transmitting a webpage request 110 to the upload server 105 and receive a copy of the upload webpage 122 from the upload server 105. In another implementation, the launcher 136 can be configured to launch the web browser 121 upon confirmation by the first user 101a, or can facilitate manual launching of the web browser 121 by the first user 101a.

As shown in FIG. 2A, the upload webpage 122 can include a user interface with one or more interface elements configured to facilitate selection and uploading of files from the mobile device 103 to the upload server 105. In the illustrated embodiment, the interface elements can include a choose file button 124, a new file button 126, and an upload button 128. The choose file button 124 can be configured to launch, for instance, a file manager that allows the first user 101a to browse through files accessible via the mobile device 103, such as the photos 120 in the storage 108. The new file button 126 can be configured launch, for instance, a photo application (not shown) via which the first user 101a can create a new photo 120. The upload button 128 can be configured to upload one or more of selected files from the mobile device 103 and transmit the selected files along with the authentication token 119b and the email identification 119c to the upload server 105. In other embodiments, the upload webpage 122 can also include menu items, lists, or other suitable interface elements configured to perform similar or different functions. In further embodiments, the upload webpage 122 can also be configured as an application downloadable to the mobile device 103 from, for example, the upload server 105 or other suitable sources upon decoding the network address 119a.

As shown in FIG. 2B, upon receiving a user input, as indicated by the cursor 115' to upload one or more selected files (e.g., a photo 120) from the mobile device 103 to the upload server 105, the sender 138 can be configured to package the selected files, the authentication token 119b, the email identification 119c, and other suitable information as a data package and transmit the data package to the upload server 105 via, for example, the computer network 104 (FIG. 1). The upload server 105 can then utilize information contained in the received data package to effect attachment of the files to the draft email 117' on the email server 106.

As shown in FIG. 2B, the upload server 105 can include a webpage component 121, an authenticate component 123, and an output component 125 operatively coupled to one another while the email server 106 can include a security component 131 and an attachment component 133 operatively coupled to each other. The webpage component 121 can be configured to provide the upload webpage 122 to the mobile device 103 upon receiving the webpage request 110. Even though the webpage component 121 is shown in FIG. 2B as a part of the upload server 105, in other embodiments, the webpage component 121 may be provided by a stand-alone web server (not shown) or other suitable computing devices.

The authenticate component 123 can be configured to authenticate to the email server 106 using the received authentication token 119b. For example, the authenticate component 123 can be configured to provide the authentication token 119b to the email server 106 and request access to an email account and the inbox 114 corresponding to the first user 101a. In response, the security component 131 at the email server 106 can validate credentials contained in the authentication token 119b and grant or deny access to the inbox 114 according to results of validation.

Upon successful authentication, as shown in FIG. 2C, the output component 125 at the upload server 105 can transmit a copy of the files (e.g., the photo 120) and the email identification 119c to the email server 106 and request the email server 106 to attach a copy of the photo 120 to the server copy of the draft email 117'. In response, the attachment component 133 can be configured to identify the server copy of the draft email 117' based on the email identification 119b and attach a copy of the received photo 120 to the identified draft email 117'. In certain embodiments, another copy of the photo 120 can also be transmitted to the client device 102 via synchronization of the local and server copies of the draft email 117 and shown in the email client 116 as an attachment to the local copy of the draft email 117, for instance, as a thumbnail 120'. In other embodiments, another copy of the photo 120 can be transmitted to the client device 102 upon the email server 106 receiving the photo 120, or in other suitable manners.

Thus, several embodiments of the disclosed technology as described above with reference to FIGS. 2A-2C can enable efficient attachment of files from the mobile device 103 without a wired or wireless local connection between the mobile device 103 and the client device 105. Instead, the network address 119a of the upload webpage 122 is provided to the mobile device 103 using an optical or other suitable types of machine-readable label 119. The upload webpage 122 can then facilitate uploading of the one or more files from the mobile device 103 to the upload server 105. Upon receiving the uploaded files, the upload server 105 can interact with the email server 106 to authenticate and attach a copy of the one or more files to a copy of the draft email 117' on the email server 106. As such, from the perspective of the first user 101a, the one or more files from the mobile device 103 can appear to be attached directly from the mobile device 103 to the draft email message 117 without having to move the files from the mobile device 103 to the client device 105. As such, cumbersome operations of copying the files between the mobile device 103 and the client device 105 can be eliminated.

Figure 3A:
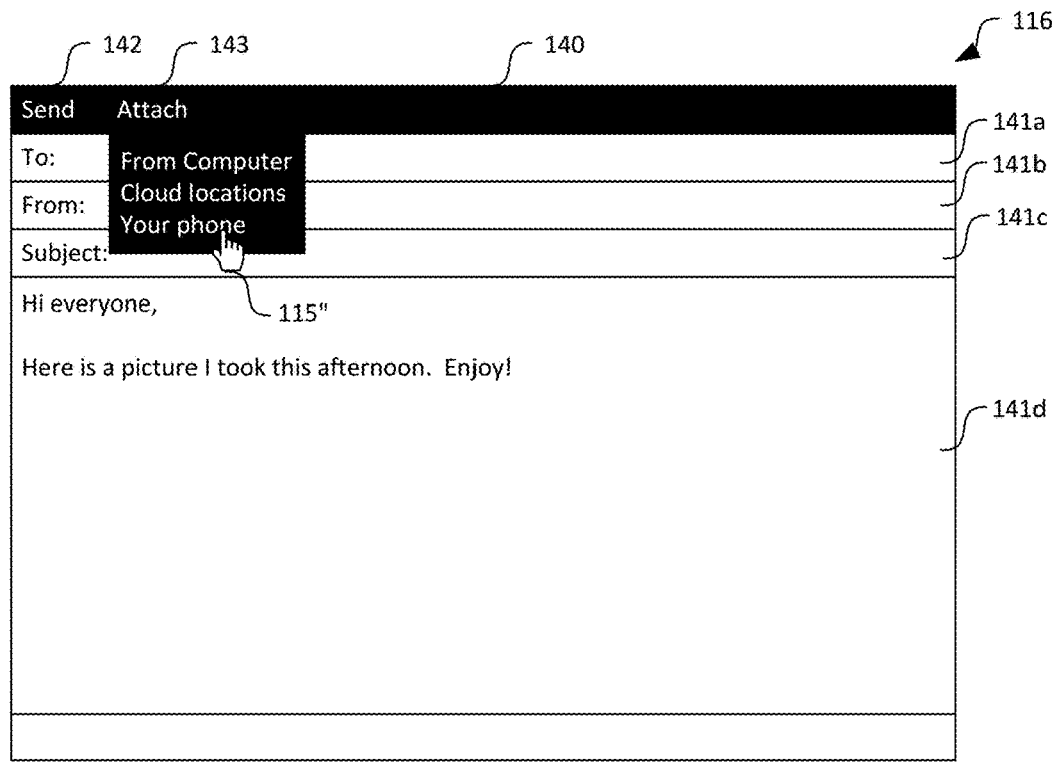
FIGS. 3A-3E are schematic diagrams illustrating an example user interface configured for efficient attachment of files in accordance with embodiments of the disclosed technology.
Figure 3B:
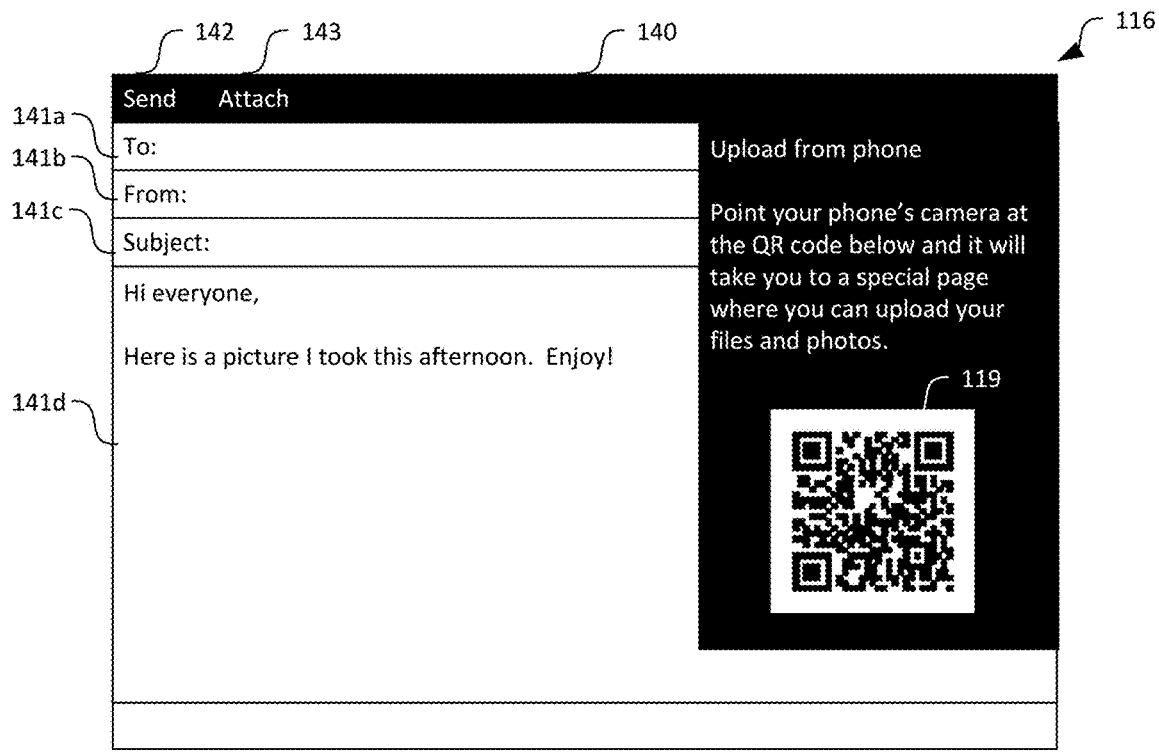

FIGS. 3A-3E are schematic diagrams illustrating example user interfaces 140 and 150 for the email client 116 and upload webpage 122 configured to facilitate efficient attachment of files in accordance with embodiments of the disclosed technology. As shown in FIG. 3A, the user interface 140 of the email client 116 can include one or more menu items such as "Send" 142 and "Attach" 143. The user interface 140 can also include input fields such as "To:" field 141a, "From:" field 141b, "Subject" field 141c, and a message body field 141d. Upon receiving a user input on the menu "Attach" 143, the user interface 140 can be configured to show a dropdown menu such as "From Computer," "Cloud Locations," and "Your phone." Upon receiving a selection of "Your Phone," as indicated by the cursor 115", the email client 116 (FIG. 1) can generate and output on the user interface 140 a machine-readable label 119 (illustrated as a QR code), as shown in FIG. 3B.

Figure 3C:
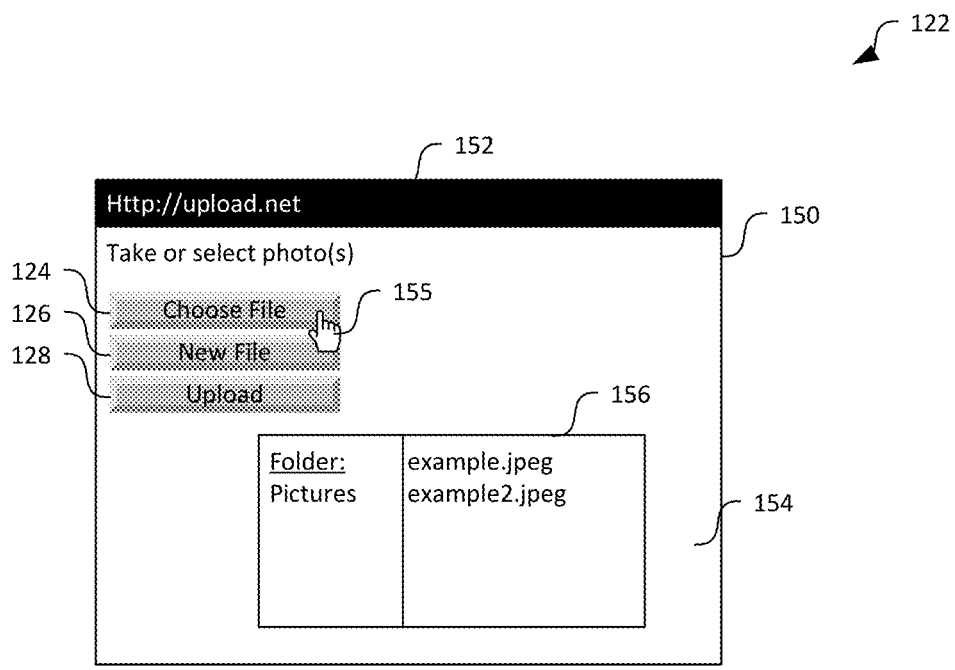

As shown in FIG. 3C, a user interface 150 of the upload webpage 122 can include an address bar 152 shown the network address 119a (e.g., "upload.net," FIG. 2A) derived from the machine-readable label 119 (FIG. 3A) at the mobile device 103 (FIG. 1). The user interface 150 can also include a body section 154 having the choose file button 124, the new file button 126, and the upload button 128. Upon actuating the choose file button 124, as indicated by the cursor 155, a selection window 156 can be displayed to show files contained in one or more folders on the mobile device 103. For example, as shown in FIG. 3C, the Pictures folder on the mobile device 103 contains photos 120 with file names "example.jpeg," and "example2.jpeg."

Figure 3D:
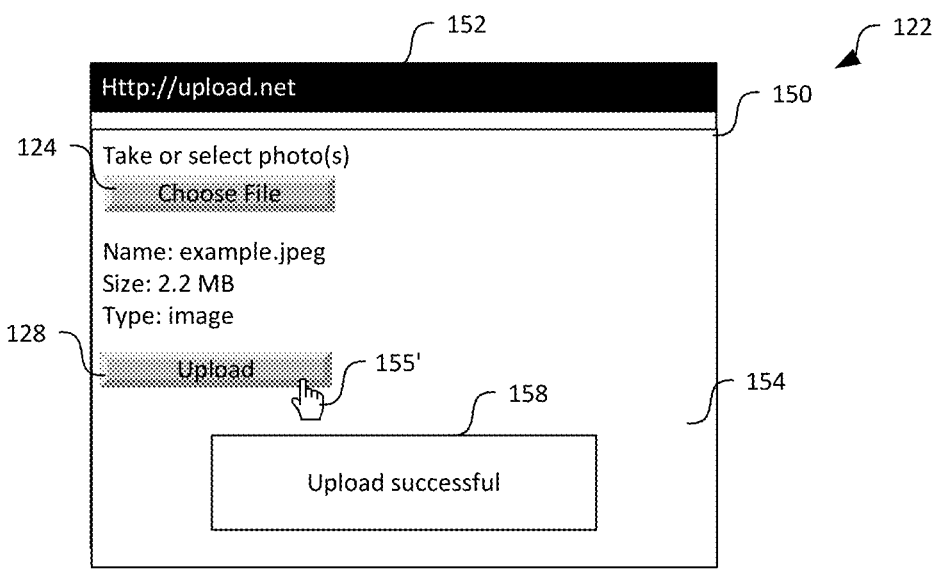

Using the selection window 156, a user 101 (FIG. 1) can then select one or more of the files from the mobile device 103 for upload. For instance, as shown in FIG. 3D, the user 101 selects "example.jpeg." In response, the upload webpage 122 can show a name (e.g., "example.jpeg"), a size (e.g., "2.2 MB"), and a type (e.g., "image") on the user interface 150. In other examples, the upload webpage 122 can show other suitable information related to the selected file in addition to or in lieu of that shown in FIG. 3D. Upon receiving another user input, as indicated by the cursor 155', to upload the selected file, the upload webpage 122 can send the selected file (e.g., "example.jpeg") from the mobile device 103 to the upload server 105 (FIG. 1). Upon a successful upload, the upload webpage 122 can also show an operation complete notification 158 indicating, for example, "Upload successful."

Figure 3E:
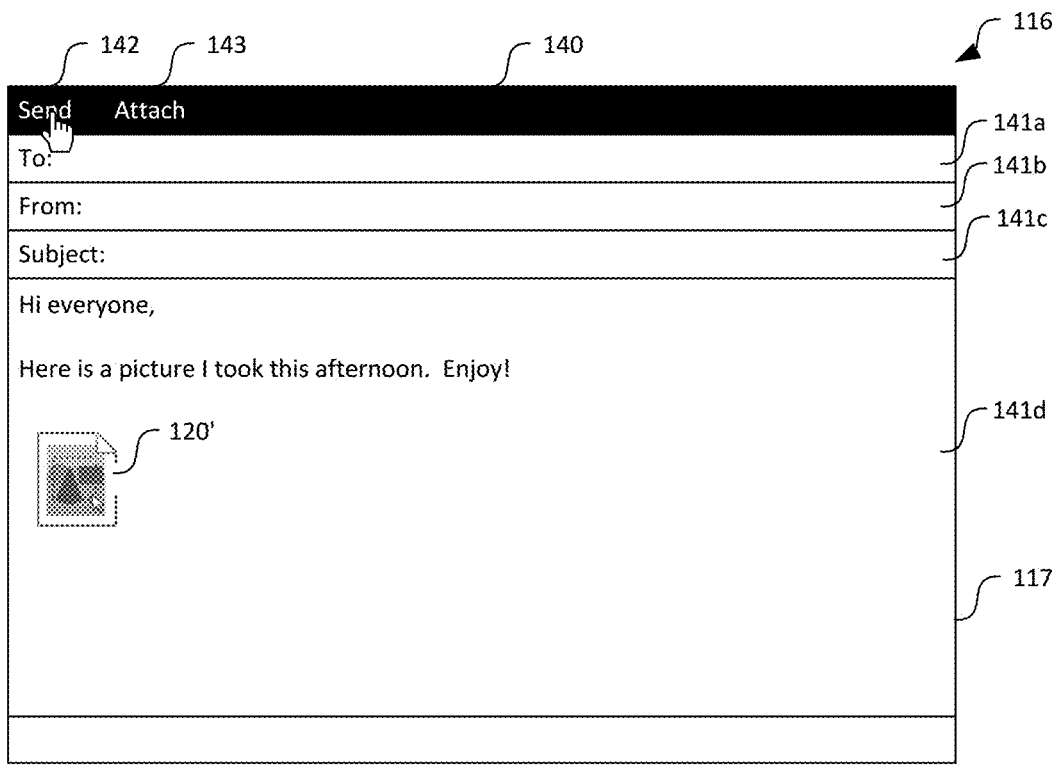

FIG. 3E shows the user interface 140 at the client device 102 after the attached file (e.g., the photo 120) is synchronized between the local and server copies. As shown in FIG. 3E, once the photo 120 has been synchronized, a thumbnail 120' can be shown in the body field of the draft email 117 on the client device 102. In other embodiments, information of the attached file can also be shown as a text string, a full size image, or in other suitable manners.

FIGS. 4A-4D are flowcharts illustrating various processes involved in efficient attachment of files in accordance with embodiments of the disclosed technology. Even though embodiments of the processes are described below with reference to the computing system 100 of FIGS. 1-2C, in other embodiments, the processes may be implemented in other computing systems with different components and/or arrangements.

Figure 4A:
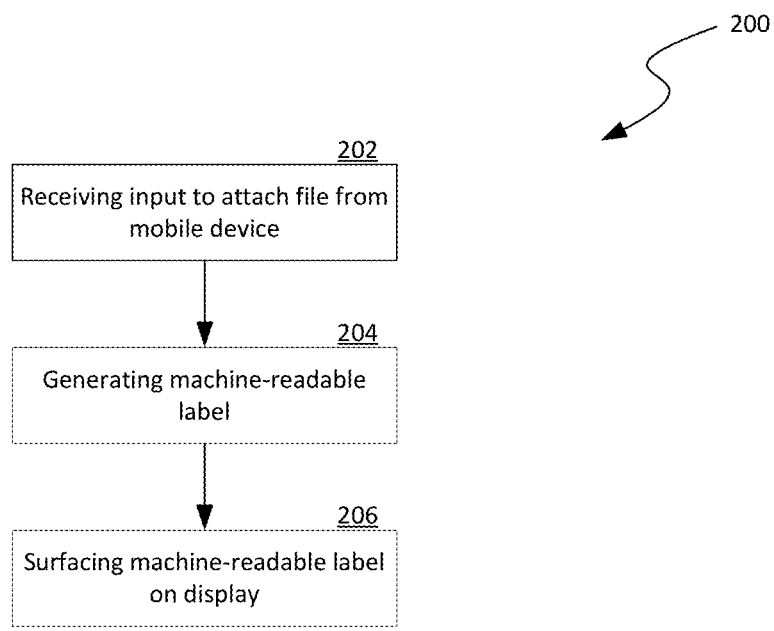
FIGS. 4A-4D are flowcharts illustrating processes of efficient attachment of files in accordance with embodiments of the disclosed technology.

As shown in FIG. 4A, a process 200 performed by, for instance, the client device 102 of FIG. 1, can include receiving a user input to attach one or more files from a mobile device 103 (FIG. 1) to a draft email 117 (FIG. 1) being composed on the client device 102 at stage 202. In response to receiving the user input, the process 200 can include generating a machine-readable label encoding a network address (e.g., a universal resource locator or URL) of an upload webpage, an authentication token to an email server of the user, an email identification (e.g., an alphanumeric string) identifying the draft email message, or other suitable information at stage 204. The process 200 can then include surfacing or outputting the generated machine-readable label on a display of the client device 102 at stage 206.

Figure 4B:
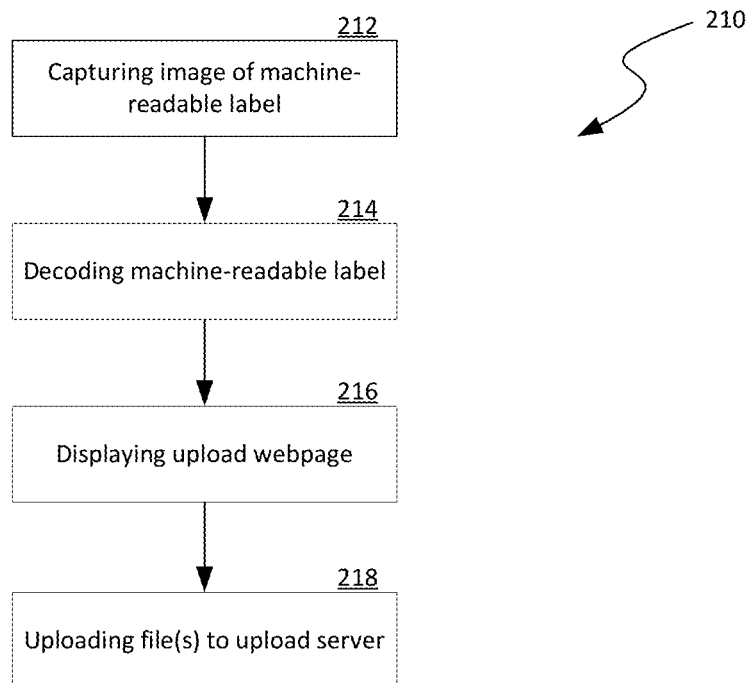

As shown in FIG. 4B, a process 210 performed by, for instance, the mobile device 103 of FIG. 1, can include capturing an image of a machine-readable label surfaced on, for instance, the client device 102 of FIG. 1, at stage 212. The process 210 can then include decoding the captured image of machine-readable label to extract information of a network address (e.g., a URL) of an upload webpage, an authentication token to an email server, an email identification (e.g., an alphanumeric string) identifying a draft email being composed on the client device 102, at stage 214. The process 210 can then include displaying the upload webpage at the extracted network address at stage 216. Example operations of displaying the upload webpage are described above with reference to FIGS. 2A-2C. The process 210 can then include, upon receiving, via the displayed upload webpage, an input to select the digital file on the mobile device for upload, uploading, from the mobile device 103, the selected file to the upload server 105 (FIG. 1) along with the decoded authentication token and the email identification of the draft email at stage 218.

Figure 4C:
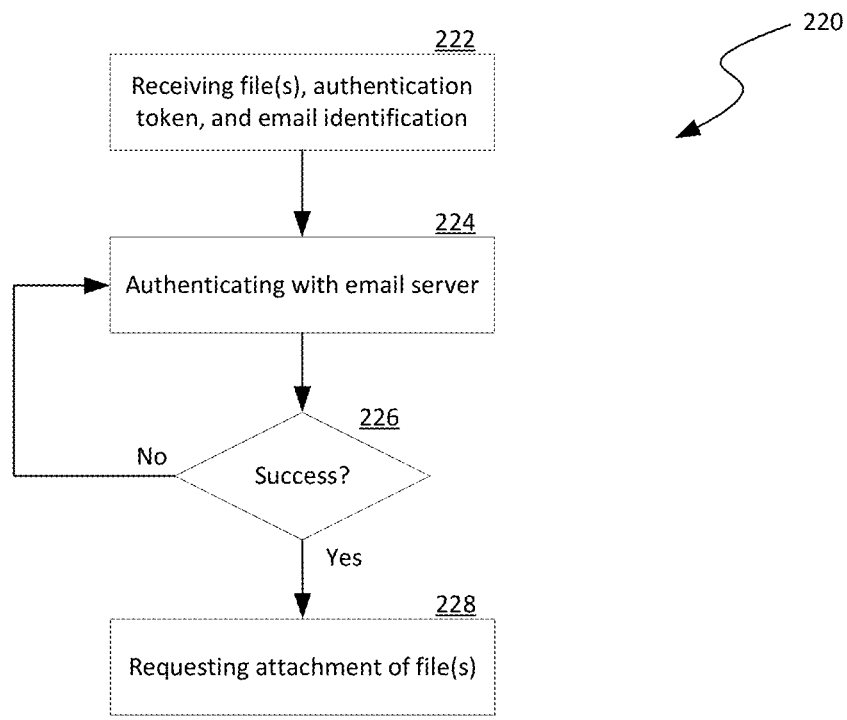

FIG. 4C illustrates a process 220 performed by, for instance, the upload server 105 of FIG. 1 for facilitating attachment of files from the mobile device 103 (FIG. 1) to the draft email 117 (FIG. 1) being composed on the client device 102 (FIG. 1). As shown in FIG. 4C, the process 220 can include receiving one or more files, an authentication token, email identification, or other suitable information from, for example, the mobile device 103 at stage 222. The process 220 can then include authenticating with the email server 106 (FIG. 1) using the received authentication token for access to a user's email account at stage 224. The process 220 can the include a decision stage 226 to determine whether the authentication is successful. In response to determining that the authentication is successful, the process 220 can include transmitting the files to the email server 106 and requesting the email server 106 to attach the files to the draft email 117 identified by the email identification at stage 228. Otherwise, the process 220 can include retrying the authentication operation for a predetermined times before discarding the received files, authentication token, and the email identification.

Figure 4D:
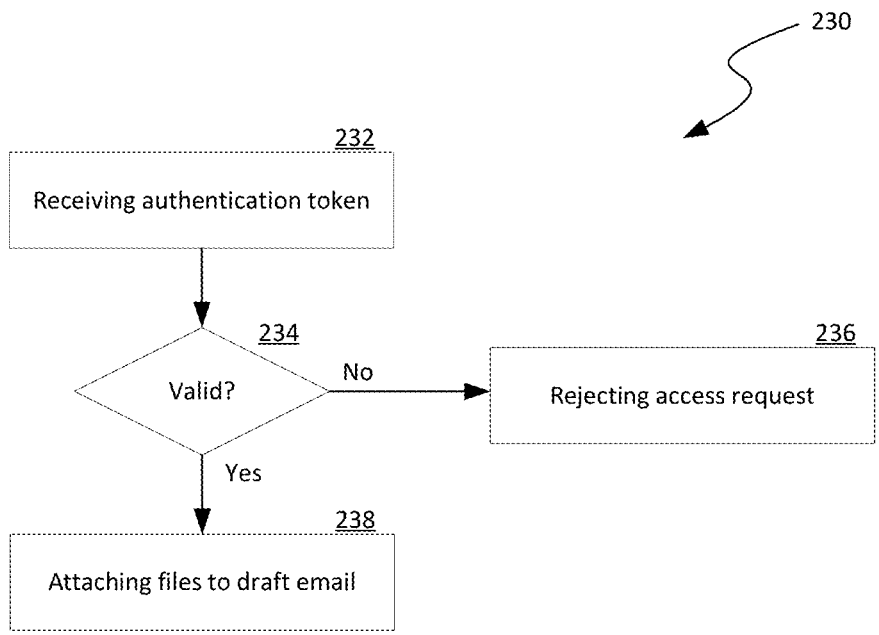

FIG. 4D illustrates a process 230 performed by, for instance, the email server 106 of FIG. 1 for facilitating attachment of files from the mobile device 103 (FIG. 1) to the draft email 117 (FIG. 1) being composed on the client device 102 (FIG. 1). As shown in FIG. 4D, the process 230 can include receiving an authentication token from, for instance, the upload server 105 (FIG. 1) at stage 232. The process 230 can then include a decision stage 234 to determine whether the authentication token is valid. In response to determining that the authentication token is not valid, the process 230 can include rejecting the access request at stage 236. Otherwise, the process 238 can include attaching one or more files received from the upload server to a draft email identified by an email identification also received from the upload server 105.

Figure 5:
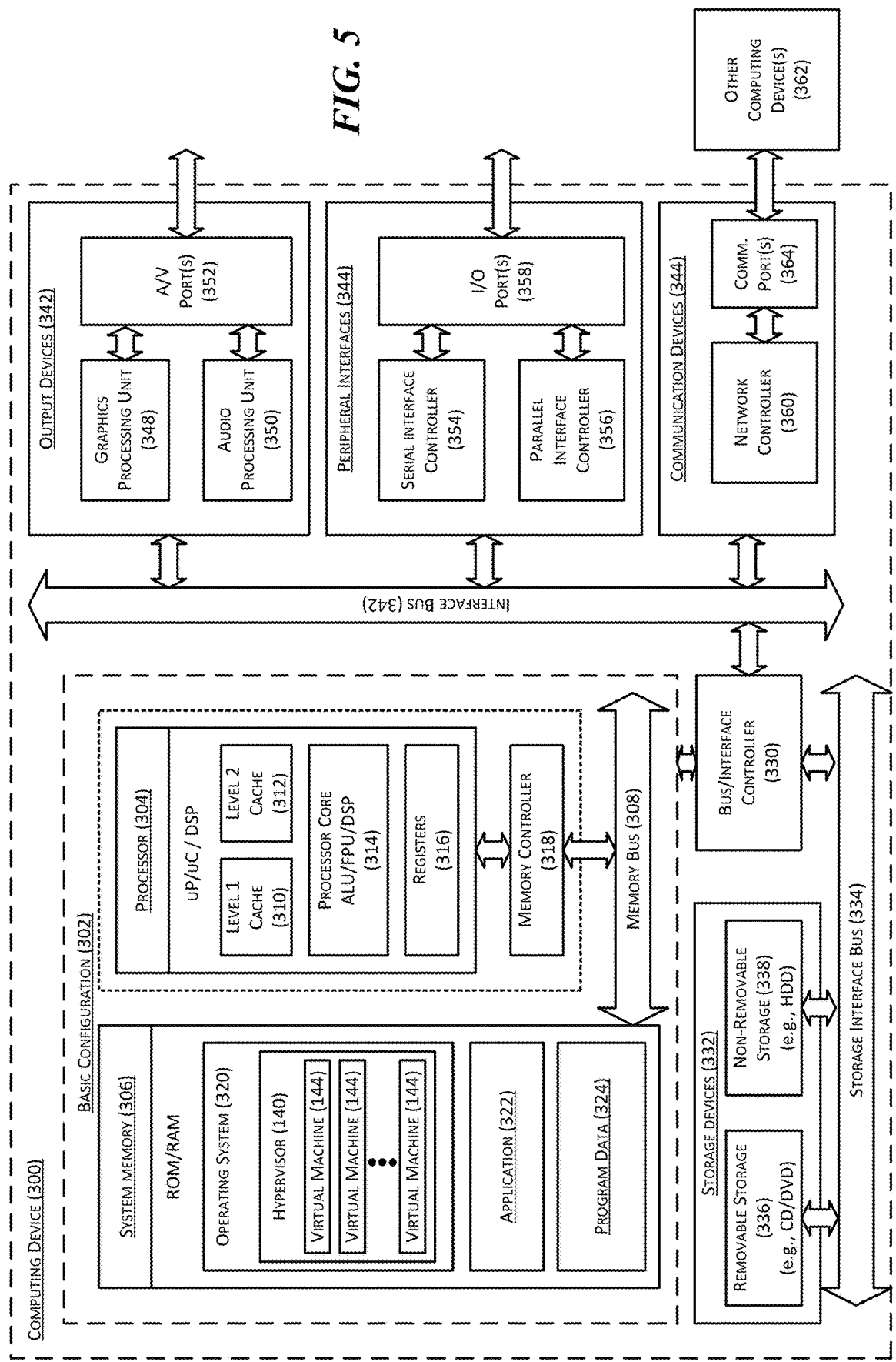
FIG. 5 is a computing device suitable for certain components of the instant message system in FIG. 1.

FIG. 5 is a computing device 300 suitable for certain components of the distributed computing system 100 in FIG. 1. For example, the computing device 300 can be suitable for the email server 106 or the client devices 102 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (µP), a microcontroller (µC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 6 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method for attaching a digital file from a mobile device to a draft email message on a client device that is interconnected to an email server by a computer network, the method comprising:
    capturing, via a camera on the mobile device, an image of a machine-readable label on a display of the client device;
    decoding, at the mobile device, the captured image of the machine-readable label to derive a network address of an upload webpage, an authentication token, and an email identification of the draft email message;
    displaying the upload webpage at the decoded network address in a web browser on the mobile device; and
    upon receiving, via the displayed upload webpage in the web browser, an input to select the digital file on the mobile device for upload, uploading, from the mobile device and via the computer network, the selected digital file to an upload server along with the decoded authentication token and the email identification of the draft email message, the authentication token being useable by the upload server to authenticate with the email server and upon authentication, provide the digital file to the email server as an attachment to a copy of the draft email message on the email server and identified by the email identification.

2. The method of claim 1 wherein capturing the image of the machine-readable label includes capturing, via the camera on the mobile device, a barcode or a Quick Response Code (QR Code) as the machine-readable label, the barcode or QR Code encoding the network address of the upload webpage, the authentication token, and the email identification of the draft email message.

3. The method of claim 1 wherein capturing the image of the machine-readable label includes capturing, via the camera on the mobile device, a barcode or a Quick Response Code (QR Code) as the machine-readable label, the barcode or QR Code encoding the network address of the upload webpage, the authentication token, and the email identification of the draft email message, and wherein the barcode or QR Code is generated by the client device upon receiving a user input at the client device to attach one or more digital files from the mobile device to the draft email message.

4. The method of claim 1 wherein capturing the image of a machine-readable label includes capturing, via the camera on the mobile device, a barcode or a Quick Response Code (QR Code) as the machine-readable label, the barcode or QR Code encoding the network address of the upload webpage, the authentication token, and the email identification of the draft email message, and wherein the email identification is generated by the email server.

5. The method of claim 1 wherein displaying the upload webpage includes:
upon decoding the network address of the upload webpage, automatically launching the web browser at the mobile device; and
loading, in the launched web browser, the upload webpage according to the decoded network address.

6. The method of claim 1 wherein displaying the upload webpage includes:
upon decoding the network address of the upload webpage,
prompting, at the mobile device, whether to launch the web browser at the mobile device; and
upon receiving a confirmation, launching the web browser at the mobile device; and
automatically loading, in the launched web browser, the upload webpage according to the decoded network address.

7. The method of claim 1 wherein displaying the upload webpage includes:
transmitting, via the computer network, a request for the upload webpage to the upload server from the web browser on the mobile device;
receiving, from the upload server, the requested upload webpage; and
outputting, on the display of the mobile device, the received upload webpage.

8. The method of claim 1, further comprising:
receiving, at the upload webpage, a selection to browse for the digital file on the mobile device; and
in response to receiving another input to select the digital file, uploading, from the mobile device, a copy of the digital file to the upload server along with the decoded authentication token and the email identification of the draft email message.

9. The method of claim 1, further comprising:
receiving, at the upload webpage, a selection to upload a new digital file; and
in response to receiving the selection,
capturing, with the camera on the mobile device, the new digital file; and
uploading, from the mobile device, the captured new digital file to the upload server along with the decoded authentication token and the email identification of the draft email message.

10. A computing device configured to for attaching a digital file from a mobile device to a draft email message on a client device interconnected to an email server by a computer network, the computing device comprising:
a processor; and
a memory operatively coupled to the processor, the memory containing instructions executable by the processor to cause the computing device to:
receive, from the mobile device, the digital file along with an authentication token and an email identification of the draft email message;
authenticate, using the received authentication token, with the email server for access to a server copy of the draft email message on the email server; and
upon successful authentication, upload a copy of the received digital file to the email server as an attachment to the server copy of the draft email message on the email server, the server copy of the draft email message being identified by the received email identification, thereby attaching the digital file from the mobile device to the draft email message without a direct local connection between the mobile device and the client device.

11. The computing device of claim 10 wherein the memory contains additional instructions executable by the processor to cause the computing device to upon receiving a request from the mobile device, provide an upload webpage to the mobile device via the computer network, the upload webpage containing control elements configured to select and upload the digital file from the mobile device to the computing device.

12. The computing device of claim 10 wherein to authenticate with the email server includes providing the authentication token to the email server, the authentication token corresponding to an email account used on the client device to compose the draft email message on the client device.

13. A mobile device, comprising:
a processor;
a camera; and
a memory operatively coupled to the processor, the memory containing instructions executable by the processor to cause the computing device to:
capture, via the camera, an image of a machine-readable label shown on a display of a client device used to compose a draft email message;
decode, with the processor, the captured image of the machine-readable label to derive a network address of a webpage, an authentication token, and an email identification identifying the draft email message being composed on the client device;
load the webpage at the decoded network address in a web browser on the mobile device; and
upon receiving, via the webpage in the web browser, an input to upload a digital file from the mobile device, transmit, from the mobile device, the digital file to an upload server along with the decoded authentication token and the email identification of the draft email message, the authentication token being useable by the upload server to authenticate with the email server and upon authentication, transmit the digital file to the email server as an attachment to a server copy of the draft email message on the email server identified by the email identification.

14. The mobile device of claim 13 wherein the image of the machine-readable label includes a barcode or a Quick Response Code (QR Code) encoding the network address of the upload webpage, the authentication token, and the email identification of the draft email message.

15. The mobile device of claim 13 wherein the image of the machine-readable label includes a barcode or a Quick Response Code (QR Code) encoding the network address of the upload webpage, the authentication token, and the email identification of the draft email message, wherein the barcode or QR Code is generated by the client device upon receiving a user input at the client device to attach one or more digital files from the mobile device to the draft email message.

16. The method of claim 13 wherein to load the webpage includes:
upon decoding the network address of the webpage, to automatically launch the web browser at the mobile device; and
output, in the launched web browser, the webpage at the decoded network address.

17. The mobile device of claim 13 wherein to load the webpage includes:
upon decoding the network address of the upload webpage,
prompt, at the mobile device, whether to launch the web browser at the mobile device; and
upon receiving a confirmation, to launch the web browser at the mobile device.

18. The mobile device of claim 13 wherein to load the webpage includes:
upon decoding the network address of the upload webpage,
prompt, at the mobile device, whether to launch the web browser at the mobile device; and
upon receiving a confirmation, to launch the web browser at the mobile device and to load the webpage in the launched web browser.

19. The mobile device of claim 13 wherein the memory contains additional instructions executable by the processor to cause the mobile device to:
receive, at the webpage, a selection of the digital file on the mobile device; and
in response to receiving the selection, upload, from the mobile device, a copy of the digital file to the upload server along with the decoded authentication token and the email identification of the draft email message.

20. The mobile device of claim 13 wherein the memory contains additional instructions executable by the processor to cause the mobile device to:
receive, at the upload webpage, a selection to upload a new digital file; and
in response to receiving the selection,
capture, with the camera, the new digital file; and
upload, from the mobile device, the captured new digital file to the upload server along with the decoded authentication token and the email identification of the draft email message.

* * * * *